Patented Nov. 11, 1952

2,617,791

UNITED STATES PATENT OFFICE 2,617,791

RECOVERY OF VALUABLE PRODUCTS FROM PENTAERYTHRITOL MOTHER LIQUOR

Walter O. Snelling, Allentown, Pa., assignor to Trojan Powder Company, a corporation of New York No Drawing. Application September 15, 1949, Serial No. 115,953

5 Claims. (Cl. 260—97.5)

This invention relates to the method of preparing valuable products from pentaerythritol mother liquor and to the products so produced.

The usual commercial process of making pentaerythritol includes the condensation of acetaldehyde and formaldehyde in contact with an alkaline condensing agent such as an aqueous calcium hydroxide slurry or aqueous sodium hydroxide solution. When the reaction is complete, the resulting solution is clarified if necessary by filtration and the clear liquor concentrated by evaporation and then cooled, to deposit a crop of crystals of pentaerythritol. After the crystals have separated, the remaining liquor is again concentrated by evaporation and again cooled, to deposit additional crystals of pentaerythritol. This process is ordinarily repeated until four crops of crystals have been obtained.

The remaining aqueous mother liquor from the crystallization is a sirup that contains many compounds. It contains some pentaerythritols. These are pentaerythritol itself and the di-, tri-, and higher pentaerythritols. It contains a metal formate, either calcium formate or sodium formate in accordance with the particular alkali used in the condensation originally. The formate is soluble in and is not crystallizable from the aqueous liquor. Then there are present polyhydroxy compounds that are non-pentaerythritol in nature, that is, not pentaerythritol, dipentaerythritol or polypentaerythritol. These compounds, I have discovered, are subject to loss of some of their esterifying capacity when the mother liquor is evaporated to dryness.

The effect of all these materials in the mother liquor is to make further recovery of pentaerythritols not commercially profitable if in fact possible at all. As a result, the mother liquor is a waste product. In Germany it is concentrated by evaporation of water and the residue is burned as a fuel. In the United States, the fuel value does not justify the cost of evaporating and processing of the mother liquor for use as a fuel. The mother liquor here goes to waste, thus introducing not only a net loss of materials but also a waste disposal problem.

I have now discovered a method by which higher fatty acid esters may be recovered from the sirup and previously uncrystallizable, soluble, inorganic formate caused to separate in insoluble form, so that an oily (ester) layer may be withdrawn from the solid formate. I have discovered also a new ester composition useful as a drying oil.

In general, the method of the present invention comprises forming a mixture of the pentaerythritol mother liquor with higher fatty acid, heating the resulting mixture at a temperature above the boiling point of water and below the temperature of initial boiling of the higher fatty acid until an oily (ester) layer and solids appear, and then separating the oily layer from the solids, as by difference of specific gravity or by filtration.

The ester fraction so produced contains only about 1% to 2% of inorganic matter represented by residue on ignition, whereas the original mother liquor on the dry basis averages over 25% of inorganic constituents.

As to materials used in my method, the mother liquor is that finally obtained from crystallization of pentaerythritol in the usual manufacturing process described. It is ordinarily of the consistency of a thin syrup and of specific gravity about 1.20 to 1.25. It contains normally about 50% of water. A representative specimen of this mother liquor from a manufacturing operation in which lime was the alkali used in the original condensation gave the following approximate analysis:

| | Per cent |
|---|---|
| Water | 50 |
| Metal formates, mostly calcium, with some magnesium formate | 14 |
| Pentaerythritol, dipentaerythritol and other pentaerythritols | 11 |
| Polyhydroxy compounds other than pentaerythritols | 25 |

In this table and elsewhere herein proportions are expressed by weight unless otherwise specifically stated.

The hydroxy content of pentaerythritol itself is approximately 50%. The hydroxy content of the syrup solids derived by careful evaporation to dryness of the mother liquor of composition described is about 25% of the weight of the total solids.

As the higher fatty acid to be reacted with the mother liquor I prefer to use tall oil. It gives a finished ester composition of desirable properties and the price of tall oil is favorable. The tall oil contains a large proportion of abietic acid or rosin which, for simplicity of description, is included herein in the meaning of "higher fatty acids." In place of the tall oil, I may use other higher fatty acid, particularly one that is available at an attractive price. Thus, I may use to advantage the fatty acids of soya bean, linseed, or cottonseed oil. In one embodiment of the invention rosin alone is used as the acid. Acids of drying or semidrying nature containing 12 to 22 carbon atoms to the molecule are preferred.

As to proportions of the raw materials, I use to advantage an excess of 10% to 40% of the hydroxy compounds of the sirup over the equivalent proportion of the fatty acid. This allows for some loss in esterifying capacity due to condensation or anhydridization of the hydroxy compounds.

As to conditions of manufacture, the aqueous mother liquor is heated with the higher fatty acid. This procedure decreases loss due to the condensation or anhydridization, as compared to the result when the mother liquor is evaporated to dryness alone and the fatty acid then added and esterified with the residue. In one embodiment of the invention, the heating of the mother liquor with the acid is continued at a temperature between 100° C. and the initial boiling point of the fatty acid, until the esterification reaction is substantially complete. This condition is determined by analyzing small samples of the resulting oily layer for free acid from time to time; when the acidity has fallen to a low value and no longer decreases appreciably in the course of 15 minutes or so, it may be assumed that the esterification reaction is practically completed. This requires ordinarily a time of 1 to 6 hours, the period of time required being shorter, the higher the temperatures at which the mixture of mother liquor and the higher fatty acid is heated.

For best results I use temperatures of heating within the range 175° to 275° C., shorter times being used at higher temperatures within the range stated and longer times of heating at lower temperatures. Four hours is ordinarily adequate at 200° and one and one-half hours at 250° C.

During the heating the whole mixture is stirred vigorously. To avoid oxidation, the atmosphere over the mixture being heated may be made carbon dioxide, nitrogen, argon, or some other gas which is inert towards the drying oils. Water is gradually boiled away. The oily layer which rises contains on the average about 0.5% to 2% of ash, usually about 1%. The solids which separate may be filtered or centrifuged so that they retain very little of the oily layer. The solids so recovered are useful as crude formate.

The esters made as described from the pentaerythritol mother liquor by warming until the esterification reaction is substantially completed are insoluble in water, having drying properties, are light brown to brown in color, subject to being made lighter in color by use of decolorizing carbon or the like, and are useful in place of conventional drying oils. In fact, these ester products from pentaerythritol mother liquor body somewhat faster on heating than do the conventional drying oils.

The new product is useful in printing ink compositions in which the product serves as a drying filler. It is useful also in making of linoleum, in this instance in the "cement" material used to bond the cork in the linoleum.

The invention will be further illustrated by detailed description in connection with the following specific examples.

Example 1

1200 g. sirup, corresponding to 600 g. solids
1400 g. soybean oil fatty acids 2600 g. reaction products, including 600 g. water.

The reaction mixture was heated at 230° C. and samples were taken after ½ hour, 1 hour and 1½ hours at this temperature. The properties of the liquid phase material represented by each of these samples were as follows:

|  | ½-Hr. Sam. | 1-Hr. Sam. | 1½-Hr. Sam. |
|---|---|---|---|
| Specific Gravity | 0.978 | 0.966 | 0.955 |
| Viscosity (poises) | 10.7 | 19.3 | 70.6 |
| Acid number | 15.4 | 10.4 | 6.92 |
| Iodine number | 112 | 113 | 113 |

The liquid reaction product was a clear but dark-colored liquid, entirely free from any suspended matter or gel particles.

Example 2

1230 g. sirup, corresponding to 615 g. solids
1510 g. tall oil 2740 g. reaction products, including 615 g. water.

The reaction mixture was heated at 230° C. and samples were taken after ½ hour, 1 hour, and 1½ hours at this temperature. The properties of the liquid phase material represented by each of these samples were as follows:

|  | ½-Hr. Sam. | 1-Hr. Sam. | 1½-Hr. Sam. |
|---|---|---|---|
| Specific Gravity | 1.005 | 1.015 | 1.06 |
| Viscosity (poises) | 48.5 | 3,000+ | 3,000+ |
| Acid number | 27.9 | 16.1 | 15.2 |
| Iodine number | 149 | 131 | 145 |

Example 3

404 g. sirup, corresponding to 202 g. solids
802 g. tall oil 1206 g. reaction products, including 202 g. water.

The reaction mixture was heated at 230° C. and a sample was taken after 1 hour. The properties of the liquid phase material represented by this sample were as follows:

|  | 1-hr. sam. |
|---|---|
| Specific gravity | 0.989 |
| Viscosity (poises) | 84.6 |
| Acid number | 14.6 |
| Iodine number | 159.0 |

In a modification of the invention, the warming of the mother liquor with the higher fatty acid is discontinued when the esterification is only approximately one-fourth to one-half completed. This leaves a material (oily layer) that may be further esterified on heating later. Such an incompletely reacted oil is useful in making certain mixed esters as in varnish making. Here the incompletely reacted oil is mixed with other varnish making materials, as, for instance, tung oil and a varnish resin, and the whole heated in accordance with varnish cooking methods, to body the materials and at the same time complete the esterification of the ester from the pentaerythritol mother liquor.

It will be understood that it is intended to cover all changes and modifications of the examples of the invention herein chosen for the purpose of illustration which do not constitute departures from the spirit and scope of the invention.

What I claim is:
1. In recovering useful products from pentaerythritol mother liquor containing water, penta- ererythritols, a metal formate, and polyhydroxy compounds that are not pentaerythritols and are subject to loss of esterifying capacity when dried to anhydrous condition in the absence of fatty acid, the method which comprises heating the mother liquor with higher fatty acid at a temperature above 100° C. but below the temperature of initial boiling of the fatty acid, until an oily (ester) layer and solid material are formed, continuing the heating until the acidity of the oily layer no longer decreases appreciably, then discontinuing the warming and separating the oily layer and solid material from each other, the said heating causing conversion of the said polyhydroxy compounds to esters of the higher fatty acid and causing also esterification of the pentaerythritols originally present.

2. In recovering useful products from pentaerythritol mother liquor containing water, pentaerythritols, a metal formate and polyhydroxy compounds other than pentaerythritols, the method which comprises heating the aqueous mother liquor with higher fatty acid containing 12 to 22 carbon atoms to the molecule and at a temperature between 175° and 275° C., continuing the heating until an oily (ester) layer and solids form, and then discontinuing the warming and separating the oily layer from the solids, the oily layer containing higher fatty acid esters of the pentaerythritols and ester derivatives of the said polyhydroxy compounds.

3. The method described in claim 2, the said heating being continued until the esterification reaction is substantially complete.

4. The method described in claim 2, the higher fatty acid used being tall oil.

5. The method described in claim 2, the warming of the mother liquor with the higher fatty acid being discontinued after the oily layer and the solids appear and while a large part of the material esterifiable under prevailing conditions remains unesterified.

WALTER O. SNELLING.

REFERENCES CITED

The following references are of record in the file of this patent:

UNITED STATES PATENTS

| Number | Name | Date |
| --- | --- | --- |
| 2,340,043 | Claire | Jan. 25, 1944 |
| 2,360,186 | Wyler | Oct. 10, 1944 |
| 2,441,602 | Snow | May 18, 1948 |

FOREIGN PATENTS

| Number | Country | Date |
| --- | --- | --- |
| 115,753 | Australia | Aug. 2, 1943 |

OTHER REFERENCES

Burrell (1), Ind. and Eng. Chem., vol. 37, pp. 86–89 (1945).

Burrell (2), Paint, Oil and Chem. Review, Dec. 1944, pp. 14–15.